(12) United States Patent
Oikawa et al.

(10) Patent No.: US 10,248,102 B2
(45) Date of Patent: Apr. 2, 2019

(54) NUMERICAL CONTROLLER OF MACHINE TOOL

(71) Applicant: FANUC CORPORATION, Yamanashi (JP)

(72) Inventors: Kouki Oikawa, Yamanashi (JP); Yuuki Morita, Yamanashi (JP); Tadashi Okita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/895,428

(22) Filed: Feb. 13, 2018

(65) Prior Publication Data

US 2018/0239328 A1    Aug. 23, 2018

(30) Foreign Application Priority Data

Feb. 22, 2017  (JP) .................... 2017-031223

(51) Int. Cl.
G05B 19/29 (2006.01)
G05B 19/19 (2006.01)
H02P 23/20 (2016.01)
H02P 5/50 (2016.01)

(52) U.S. Cl.
CPC ............ G05B 19/19 (2013.01); G05B 19/29 (2013.01); H02P 23/20 (2016.02); G05B 2219/37389 (2013.01); G05B 2219/42064 (2013.01); H02P 5/50 (2013.01)

(58) Field of Classification Search
CPC ...... H02P 1/00; H02P 1/24; H02P 1/42; H02P 1/46; H02P 23/00; H02P 27/00; G05B 11/01; G05B 13/00; G05B 19/416; G05B 19/408; G05B 19/18; G05B 19/25; G05B 19/29; G05F 1/04; G05F 1/08

USPC .......... 318/560, 561, 568.18, 569, 571, 600, 318/625, 628, 651, 677, 680, 681, 34, 35, 318/37, 38, 39, 58, 61, 64, 115, 119, 127, 318/128, 135, 700, 400.14, 400.12, 721, 318/727, 799; 720/695, 696; 483/11, 15,
(Continued)

(56) References Cited

U.S. PATENT DOCUMENTS

RE33,910 E *  5/1992  Compton ............. G05B 19/184
                                                                318/135
9,190,946 B2 * 11/2015  Shibata ............... H02P 23/0004

FOREIGN PATENT DOCUMENTS

| JP | 5-69275 | 3/1993 |
|---|---|---|
| JP | 2000-263377 | 9/2000 |
| JP | 2013-56392 | 3/2013 |

(Continued)

*Primary Examiner* — Antony M Paul
(74) *Attorney, Agent, or Firm* — Wenderoth, Lind & Ponack, L.L.P.

(57) ABSTRACT

A numerical controller for controlling a machine tool including a spindle motor formed of an induction motor includes: a storage unit that stores a maximum acceleration at which the spindle motor can operate when a magnetic flux amount of the spindle motor reaches its maximum; a magnetic flux amount acquisition unit that acquires a present magnetic flux amount of the spindle motor; and an acceleration change unit that changes an acceleration of a position command based on a maximum acceleration of the spindle motor stored in the storage unit according to a magnetic flux amount at the start of movement of the spindle motor acquired by the magnetic flux amount acquisition unit when the spindle motor is operated by position control using a position command.

7 Claims, 6 Drawing Sheets

(58) Field of Classification Search
USPC ......... 483/16, 17, 30; 408/31, 186; 700/159,
700/160, 175, 193
See application file for complete search history.

(56) References Cited

FOREIGN PATENT DOCUMENTS

| | | |
|---|---|---|
| JP | 2013-186545 | 9/2013 |
| JP | 2018-86697 | 6/2018 |

* cited by examiner

NUMERICAL CONTROLLER OF MACHINE TOOL

This application is based on and claims the benefit of priority from Japanese Patent Application No. 2017-031223, filed on 22 Feb. 2017, the content of which is incorporated herein by reference.

BACKGROUND OF THE INVENTION

Field of the Invention

The present invention relates to a numerical controller of a machine tool including a spindle motor formed of an induction motor.

Related Art

When a work is machined using a machine tool having a spindle and a feed axis, the movement of the spindle is relatively often interlocked with the movement of the feed axis. In such a case, in a general numerical controller that controls a machine tool, a feed axis is controlled using a characteristic value or a measurement value associated with the spindle, or the spindle is controlled using a characteristic value or a measurement value associated with the feed axis.

For example, Patent Document 1 discloses a technique of controlling a feed rate using data corrected using a change in number of revolutions of a spindle motor in order to enable high-accuracy machining even when the actual speed of the spindle motor used as a spindle motor varies abruptly.

Patent Document 2 discloses a technique of controlling a feed rate of machining feeding means so that a load current value of a motor during machining is equal to or smaller than a maximum load current value corresponding to a desired flatness in order to machine a machining target such as a semiconductor wafer in a desired flatness by one machining operation.

Patent Document 3 discloses a technique of detecting an excitation current of a static pressure magnetic composite bearing in order to detect a machining state of a mold.

Patent Document 1: Japanese Unexamined Patent Application, Publication No. H05-69275
Patent Document 2: Japanese Unexamined Patent Application, Publication No. 2013-56392
Patent Document 3: Japanese Unexamined Patent Application, Publication No. 2000-263377

SUMMARY OF THE INVENTION

An induction motor is sometimes used as a spindle motor of a machine tool. Here, an induction motor is a motor that causes an excitation current to flow into a stator coil to generate a rotating magnetic field and generate an induction current in a rotor so that the rotor rotates with the electromagnetic force so as to follow the rotation of the rotating magnetic field. The induction motor has a drawback that heat is generated when an excitation current flows into the stator coil. In order to avoid this drawback, a technique of weakening a magnetic flux or an excitation current of a rotating magnetic field when a load on the induction motor is light and a high torque is not required may be used. This technique is often used when an induction motor is controlled by speed control based on a speed command.

However, for example, when synchronous operation of a spindle motor and a feed axis motor is performed, an induction motor which is the spindle motor is often controlled by position control based on a position command. In this case, a control mode of the induction motor is switched from speed control to position control. In this case, as described above, when the control mode is switched from speed control to position control to accelerate or decelerate the induction motor in a state in which a torque is decreased due to a weakened magnetic flux of the induction motor which is a spindle motor, since it is not possible to accelerate or decelerate the induction motor immediately with a maximum torque (acceleration), the induction motor cannot follow the position command. Due to this, there is a possibility that a deviation amount with respect to a position command may increase, an overshoot of a spindle may occur, and a machining error may become too large. Moreover, synchronization accuracy between the spindle motor and the feed axis motor may deteriorate.

In this respect, Patent Documents 1 and 2 do not aim to suppress heat generation and improve stability of position control based on a position command. Moreover, in Patent Document 3, the detected excitation current value is merely used for detecting the machining state.

Therefore, an object of the present invention is to provide a numerical controller of a machine tool, capable of suppressing heat generation and realizing stable position control.

(A) A numerical controller (for example, a numerical controller 100, 200 to be described later) for machine tools according to the present invention is a numerical controller for controlling a machine tool (for example, a machine tool 150 to be described later) including a spindle motor (for example, an induction motor 125 to be described later) formed of an induction motor, the numerical controller including: a storage unit (for example, a storage unit 101 to be described later) that stores a maximum acceleration at which the spindle motor can operate when a magnetic flux amount of the spindle motor reaches its maximum; a magnetic flux amount acquisition unit (for example, a magnetic flux amount acquisition unit 102 to be described later) that acquires a present magnetic flux amount of the spindle motor; and an acceleration change unit (for example, an acceleration change unit 103 to be described later) that changes an acceleration of a position command based on a maximum acceleration of the spindle motor stored in the storage unit according to a magnetic flux amount at the start of movement of the spindle motor acquired by the magnetic flux amount acquisition unit when the spindle motor is operated by position control using a position command.

(B) The numerical controller according to (A) may further include a position command creation unit (for example, a position command creation unit 104 to be described later) that creates a position command of a plurality of motors (for example, an induction motor 125 and a servo motor 145 to be described later) for synchronous operation on the basis of the acceleration of the position command of the spindle motor changed by the acceleration change unit when the plurality of motors including the spindle motor is synchronously operated by position control.

(C) In the numerical controller according to (A) or (B), the acceleration change unit may change the acceleration of the position command such that the smaller the magnetic flux amount at the start of movement of the spindle motor, the smaller the acceleration of the position command.

(D) In the numerical controller according to (C), the acceleration change unit changes the acceleration A of the position command according to the following equation (1) based on a maximum acceleration Amax of the spindle motor, a magnetic flux amount Φ at the start of movement of the spindle motor, and an arbitrary proportional constant α.

$$A = A\max \times \alpha \times \Phi \quad (1)$$

(E) In the numerical controller according to (C), the acceleration change unit may change the acceleration A of the position command according to the following equation (2) based on a maximum acceleration Amax of the spindle motor, a maximum magnetic flux amount Φmax of the spindle motor, and a magnetic flux amount Φ at the start of movement of the spindle motor.

$$A = A\max \times \Phi / \Phi\max \quad (2)$$

(F) In the numerical controller according to any one of (A) to (E), the magnetic flux amount acquisition unit may estimate a present magnetic flux amount of the spindle motor and acquires the estimated magnetic flux amount as the present magnetic flux amount.

(G) The numerical controller according to any one of (A) to (E) may further include a ratio calculation unit (for example, a ratio calculation unit 105 to be described later) that receives a present magnetic flux amount of the spindle motor acquired by the magnetic flux amount acquisition unit and calculates a magnetic flux amount ratio which is a ratio of the present magnetic flux amount of the spindle motor to the maximum magnetic flux amount of the spindle motor, wherein the acceleration change unit changes the acceleration of the position command based on the maximum acceleration of the spindle motor according to the magnetic flux amount ratio calculated by the ratio calculation unit.

According to the present invention, it is possible to provide a numerical controller of a machine tool, capable of suppressing heat generation and realizing stable position control.

DETAILED DESCRIPTION OF THE INVENTION

First Embodiment

Figure 1:
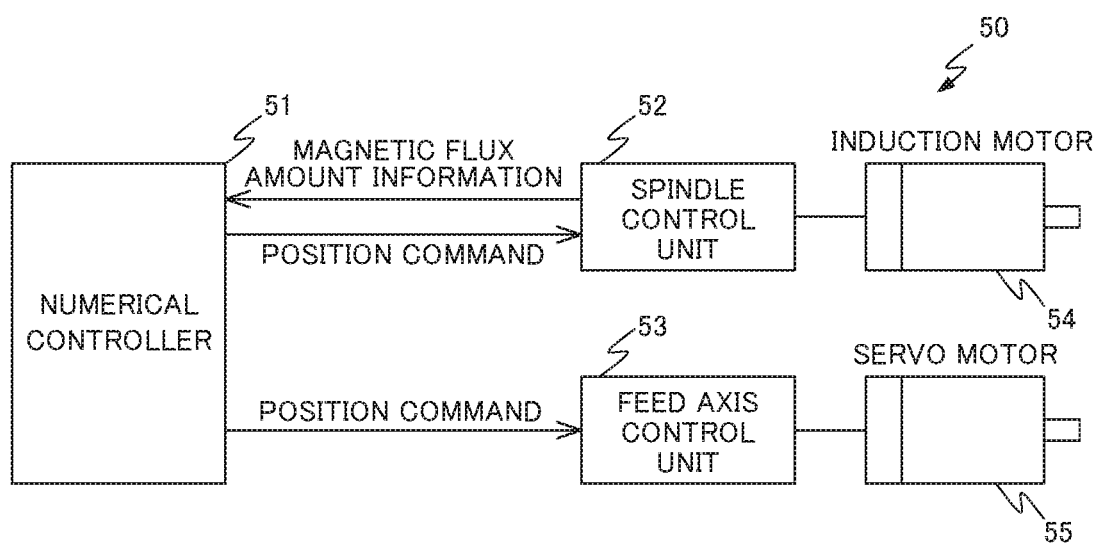
FIG. 1 is a conceptual diagram of the present invention.

Hereinafter, a first embodiment of the present invention will be described in detail with reference to FIGS. 1 to 5. FIG. 1 is a diagram illustrating a basic concept of the present invention. Here, a numerical control system 50 includes a numerical controller 51, a spindle control unit 52, a feed axis control unit 53, an induction motor 54 as a spindle motor, and a servo motor 55 as a feed axis driving motor. Moreover, the numerical controller 51 controls the induction motor 54 with the aid of the spindle control unit 52 and controls the servo motor 55 with the aid of the feed axis control unit 53.

Although an induction motor is often controlled by speed control based on a speed command, when synchronous operation of the induction motor (the spindle motor) 54 and the servo motor (the feed axis motor) 55 is performed, the control mode of the induction motor is switched from speed control to position control based on a position command. In this case, when acceleration or deceleration of the induction motor 54 is performed by switching the control mode from speed control to position control in a state in which the magnetic flux of the induction motor 54 is weak, the induction motor 54 may not follow the position command, an overshoot of the spindle may occur, and a machining error may become too large. Moreover, the synchronization accuracy between the induction motor 54 and the servo motor 55 may deteriorate. The spindle control unit 52 acquires the magnetic flux amount of the induction motor 54. The spindle control unit 52 transmits this magnetic flux amount, or as another example, the ratio (hereinafter also referred to as a "magnetic flux amount ratio") of a present magnetic flux amount to the maximum magnetic flux amount of the induction motor 54 to the numerical controller 51.

The numerical controller 51 changes an acceleration of the position command of the induction motor 54 by taking this magnetic flux amount data or the magnetic flux amount ratio into consideration and transmits a position command created on the basis of the changed acceleration to the spindle control unit 52. Moreover, the numerical controller 51 also creates a position command of the servo motor 55 on the basis of the acceleration of the position command of the induction motor 54 and transmits the position command to the feed axis control unit 53. The spindle control unit 52 and the feed axis control unit 53 controls the induction motor 54 and the servo motor 55 according to the position commands received from the numerical controller 51.

As described above, although the magnetic flux amount or the magnetic flux amount ratio is transmitted from the spindle control unit 52 to the numerical controller 51, the spindle control unit 52 and the numerical controller 51 perform bidirectional communication every predetermined cycle in reality. Due to this, during this communication, the magnetic flux amount or the magnetic flux amount ratio may be delivered from the spindle control unit 52 to the numerical controller 51.

Figure 2:
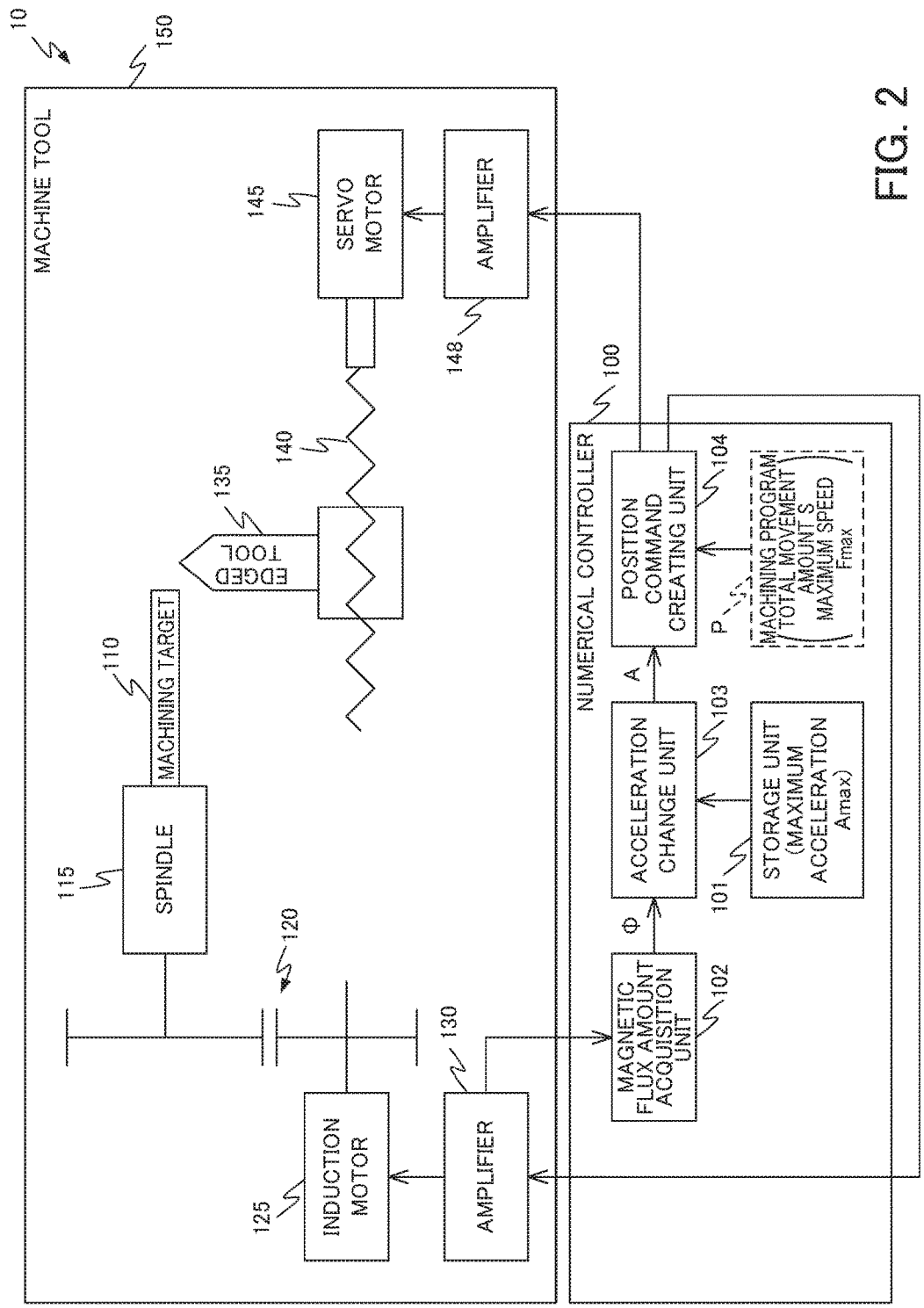
FIG. 2 is a diagram illustrating a configuration of a control system according to a first embodiment of the present invention.

FIG. 2 illustrates a configuration example of a numerical control system 10 according to the first embodiment. The numerical control system 10 includes a numerical controller 100 and a machine tool 150. The machine tool 150 includes a spindle 115 to which a machining target 110 is attached, a speed change gear 120, an induction motor 125 as the spindle motor that rotates the spindle 115 with the aid of the speed change gear 120, an amplifier 130 that outputs a driving current of the induction motor 125, an edged tool 135 that cuts the machining target 110, a ball screw 140 that moves the edged tool 135 in an axial direction, a servo motor 145 that rotates the ball screw 140 as a feed axis driving motor, and an amplifier 148 that outputs a driving current of the servo motor 145. The motor is not limited to a motor of which the shaft rotates but may be a linear motor. The amplifier 130 in FIG. 2 corresponds to the spindle control unit 52 in FIG. 1. The amplifier 148 in FIG. 2 corresponds to the feed axis control unit 53 in FIG. 1.

The numerical controller 100 controls the induction motor 125 and the servo motor 145 so that the edged tool 135 that moves with rotation of the bail screw 140 performs desired cutting machining with respect to the machining target 110 attached to the spindle 115 that rotates with rotation of the induction motor 125. Specifically, the numerical controller 100 includes a storage unit 101, a magnetic flux amount acquisition unit 102, an acceleration change unit 103, and a position command creation unit 104. Here, although not illustrated in the drawing, the numerical controller 100 may include the same constituent elements and functions as those of an ordinary numerical controller.

The storage unit 101 stores a maximum acceleration Amax (parameter) at which the induction motor 125 can operate when the magnetic flux amount of the induction motor 125 reaches its maximum. Moreover, the storage unit 101 stores a time constant of a magnetic flux amount change in the induction motor 125. The storage unit 101 may stores one time constant and may store a plurality of time constants set depending on a magnetic flux amount at the start of machining.

The magnetic flux amount acquisition unit 102 acquires a present magnetic flux amount Φ (at the start of movement) of the induction motor 125 from the amplifier 130. A method of acquiring (estimating) information on the magnetic flux amount in the magnetic flux amount acquisition unit 102 will be described later with reference to FIG. 4.

When the induction motor 125 is operated by the position control based on the position command, the acceleration change unit 103 changes the acceleration A of the position command based on the maximum acceleration Amax of the induction motor 125 stored in the storage unit 101 according to the present magnetic flux amount Φ (at the start of movement) of the induction motor 125 acquired by the magnetic flux amount acquisition unit 102. Specifically, the acceleration change unit 103 changes the acceleration A of the position command according to the following equation (1) based on the maximum acceleration Amax of the induction motor 125, the present magnetic flux amount Φ (at the start of movement) of the induction motor 125, and an arbitrary proportional constant α.

$$A = A\text{max} \times \alpha \times \Phi \quad (1)$$

When the induction motor 125 and the servo motor 145 are synchronously operated by position control, the position command creation unit 104 creates the position commands of the induction motor 125 and the servo motor 145 for synchronous operation on the basis of the acceleration A of the position command of the induction motor 125 changed by the acceleration change unit 103. Specifically, the position command creation unit 104 creates the position command of the induction motor 125 on the basis of the acceleration A of the position command of the induction motor 125 from the acceleration change unit 103 and a total movement amount S and a maximum speed max for the induction motor 125 acquired from a machining program P. Moreover, the position command creation unit 104 creates the position command of the servo motor 145 on the basis of the acceleration A of the position command of the induction motor 125 from the acceleration change unit 103 and a total movement amount and a maximum speed for the servo motor 145 acquired from the machining program P. A method of creating the position command in the position command creation unit 104 will be described later with reference to FIG. 5.

Figure 3:
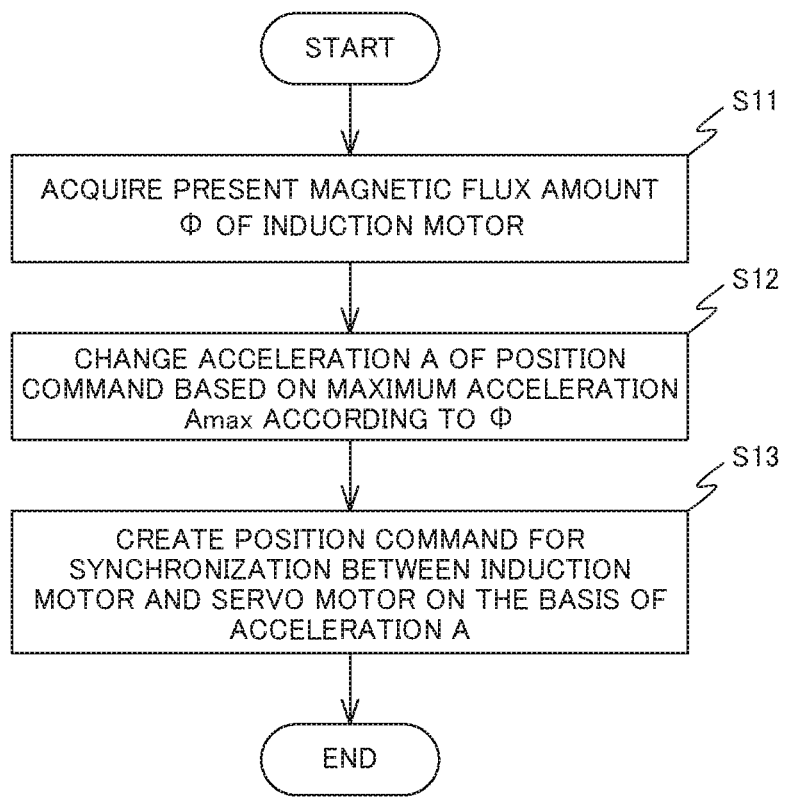
FIG. 3 is a diagram illustrating an operation of the control system according to the first embodiment of the present invention.

FIG. 3 illustrates an operation of the numerical control system 10 according to the first embodiment. In FIG. 3, an operation in which the induction motor 125 and the servo motor 145 are synchronously operated by position control, and the induction motor 125 is operated by switching the control mode from the speed control based on a speed command to the position control based on a position command is considered.

In step S11, the magnetic flux amount acquisition unit 102 acquires the present magnetic flux amount Φ (at the start of movement) of the induction motor 125 from the amplifier 130.

The magnetic flux amount acquisition unit 102 may acquire the present magnetic flux amount Φ (at the start of movement) of the induction motor 125 directly from the induction motor 125 or may detect the present magnetic flux amount Φ. Alternatively, for example, the present magnetic flux amount Φ (at the start of movement) may be estimated according to an excitation current amount or the like of the induction motor 125. Here, an example of an estimation method will be described with reference to FIG. 4.

Figure 4:
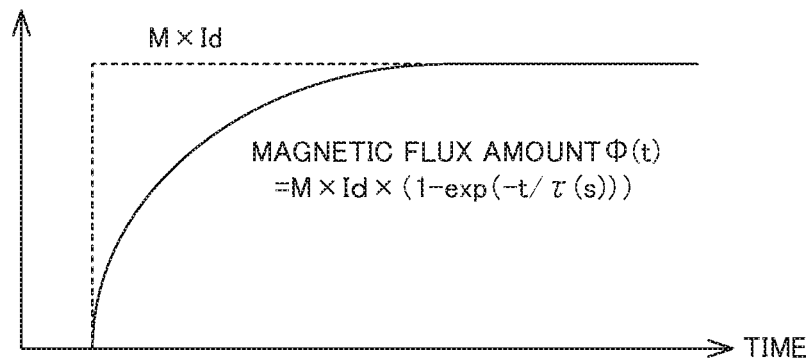
FIG. 4 is an explanatory diagram of a method of estimating a magnetic flux amount according to the present invention.

The magnetic flux amount Φ of the induction motor is proportional to the product of the excitation current (Id) for creating a magnetic flux and the mutual inductance M of the induction motor. Although the numerical controller of an induction motor changes the excitation current according to a target magnetic flux amount, the actual magnetic flux shows a response of a primary delay having a time constant τ(s) in relation to a change in the excitation current. When a constant excitation current Id is supplied continuously from a state of the excitation current Id=0 and the magnetic flux amount Φ=0, the magnetic flux amount Φ(t) after the elapse of t (sec) is estimated as the following equation (3) as illustrated in FIG. 4.

$$\Phi(t) = M \times Id \times (1 - \exp(-t/\tau(s))) \quad (3)$$

In actual calculation, a command value of an excitation current or a feedback value is used as the excitation current Id, and an output obtained by applying a primary low-pass filter having the time constant τ to M×Id obtained every control cycle is used as an estimated magnetic flux value. The magnetic flux amount acquisition unit 102 estimates the magnetic flux amount of the induction motor 125 and acquires the estimated magnetic flux amount as the present magnetic flux amount (at the start of movement).

Subsequently, in step S12, the acceleration change unit 103 changes the acceleration A of the position command based on the maximum acceleration Amax of the induction motor 125 stored in the storage unit 101 according to the present magnetic flux amount Φ (at the start of movement) of the induction motor 125 acquired by the magnetic flux amount acquisition unit 102. Specifically, the acceleration change unit 103 changes the acceleration A of the position command according to the equation (1) based on the maximum acceleration Amax of the induction motor 125, the present magnetic flux amount Φ (at the start of movement) of the induction motor 125, an arbitrary proportional constant α. In this way, the acceleration change unit 103 changes the acceleration Amax of the position command such that the smaller the present magnetic flux amount Φ (at the start of movement) of the induction motor 125, the smaller the acceleration A of the position command. That is, the acceleration A is increased when the present magnetic flux amount Φ (at the start of movement) is large, whereas the acceleration A is decreased when the present magnetic flux amount Φ (at the start of movement) is small.

Subsequently, in step S12, the position command creation unit 104 creates a position command for synchronization between the induction motor 125 and the servo motor 145 on the basis of the acceleration A of the position command of the induction motor 125 changed by the acceleration change unit 103. Specifically, the position command creation unit 104 creates a position command of the induction motor 125 on the basis of the acceleration A of the position command of the induction motor 125 from the acceleration change unit 103 and a total movement amount S and a maximum speed Fmax for the induction motor 125 acquired from the machining program P. Moreover, the position command creation unit 104 creates a position command of the servo motor 145 on the basis of the acceleration A of the position command of the induction motor 125 from the acceleration change unit 103 and a total movement amount and a maximum speed for the servo motor 145 acquired from the machining program P. Here, an example of a position command creation method will be described with reference to FIG. 3.

Figure 5:
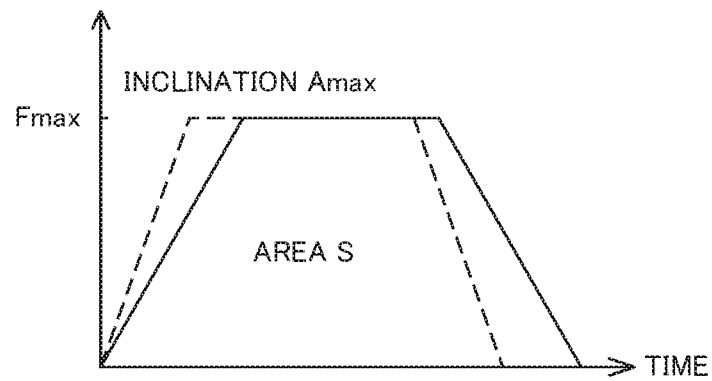
FIG. 5 is a diagram illustrating an example of a position command for position control according to the present invention.

FIG. 5 is a schematic diagram illustrating an example of a position command. In FIG. 5, a vertical axis indicates a position command per unit time and a horizontal axis indicates a time. As indicated by a solid line in FIG. 5, the position command creation unit 104 generation a position command so that the maximum value of the position command per unit time is the maximum speed Fmax, a change in the position command per unit time (that is, an inclination of an increase or a decrease) is the acceleration A, and the area is the total movement amount S.

FIG. 5 illustrates a position command created on the basis of the maximum acceleration Amax (see dot lines). From this, it can be understood that, in the present embodiment, the inclination of an increase or a decrease in the position command per unit time (that is, an acceleration of the position command) is decreased.

The position command creation unit 104 outputs the created position command of the induction motor 125 to the amplifier 130 and outputs the created position command of the servo motor 145 to the amplifier 148. Since the feed positron of the ball screw 140 which is a feed axis is the product of the rotation position of the servo motor 145 and the pitch width of the ball screw 140, the feed position of the feed axis is changed when the rotation position of the servo motor 145 is changed.

Advantages of First Embodiment

In the numerical control system 10 according to the first embodiment, when position control based on a position command is performed, by changing the acceleration of the position command of the induction motor 125 according to the magnetic flux amount of the induction motor 125, it is possible to suppress heat generation in a light load state of the induction motor 125 and realize stable position control during acceleration or deceleration of the induction motor 125.

Specifically, a case in which a technique of weakening a magnetic flux or an excitation current of a rotating magnetic field when a load on the induction motor 125 is light and a high torque is not required in a mode in which the induction motor 125 is controlled by speed control based on a speed command in order to avoid a drawback that heat is generated when an excitation current flows into a stator coil of the induction motor 125 is used will be considered.

When synchronous operation of the spindle motor and the feed axis motor is performed, the control mode of the induction motor 125 which is the spindle motor is switched from speed control to position control based on a position command. In this case, as described above, when the control mode is switched from speed control to position control to accelerate or decelerate the induction motor 125 in a state in which a torque is decreased due to a weakened magnetic flux of the induction motor 125, since it is not possible to accelerate or decelerate the induction motor 125 immediately with a maximum torque (maximum acceleration), the induction motor 125 cannot follow the position command. Due to this, there is a possibility that a deviation amount with respect to a position command may increase, an overshoot of a spindle may occur, and a machining error may become too large. However, in the present embodiment, control is performed such that the acceleration A of the position command of the induction motor 125 is decreased when the present magnetic flux amount $\Phi$ (at the start of movement) of the induction motor 125 is small. In this way, the induction motor 125 can follow the position command and the deviation with respect to the position command decreases. Due to this, it is possible to suppress occurrence of an overshoot of the spindle and a machining error from becoming too large and to realize stable position control.

Moreover, in the present embodiment, since the acceleration of the position command of the servo motor 145 is also created on the basis of the acceleration of the speed command of the induction motor 125, it is possible to suppress deterioration of the synchronization accuracy between the spindle motor and the feed axis motor.

In general, when position control based on a position command is used as a control mode of the induction motor, the maximum acceleration at which the induction motor can operate at the maximum magnetic flux amount may be set as the acceleration of the position command of the induction motor after waiting until the magnetic flux amount of the induction motor reaches its maximum. However, in the present embodiment, when synchronous operation of the spindle motor and the feed axis motor 5 performed (that is, when the control mode of the induction motor 125 which is the spindle motor is switched from speed control to position control), it is possible to output the position command immediately and perform control of the induction motor 125 without waiting until the magnetic flux amount of the induction motor reaches its maximum.

Second Embodiment

Figure 6:
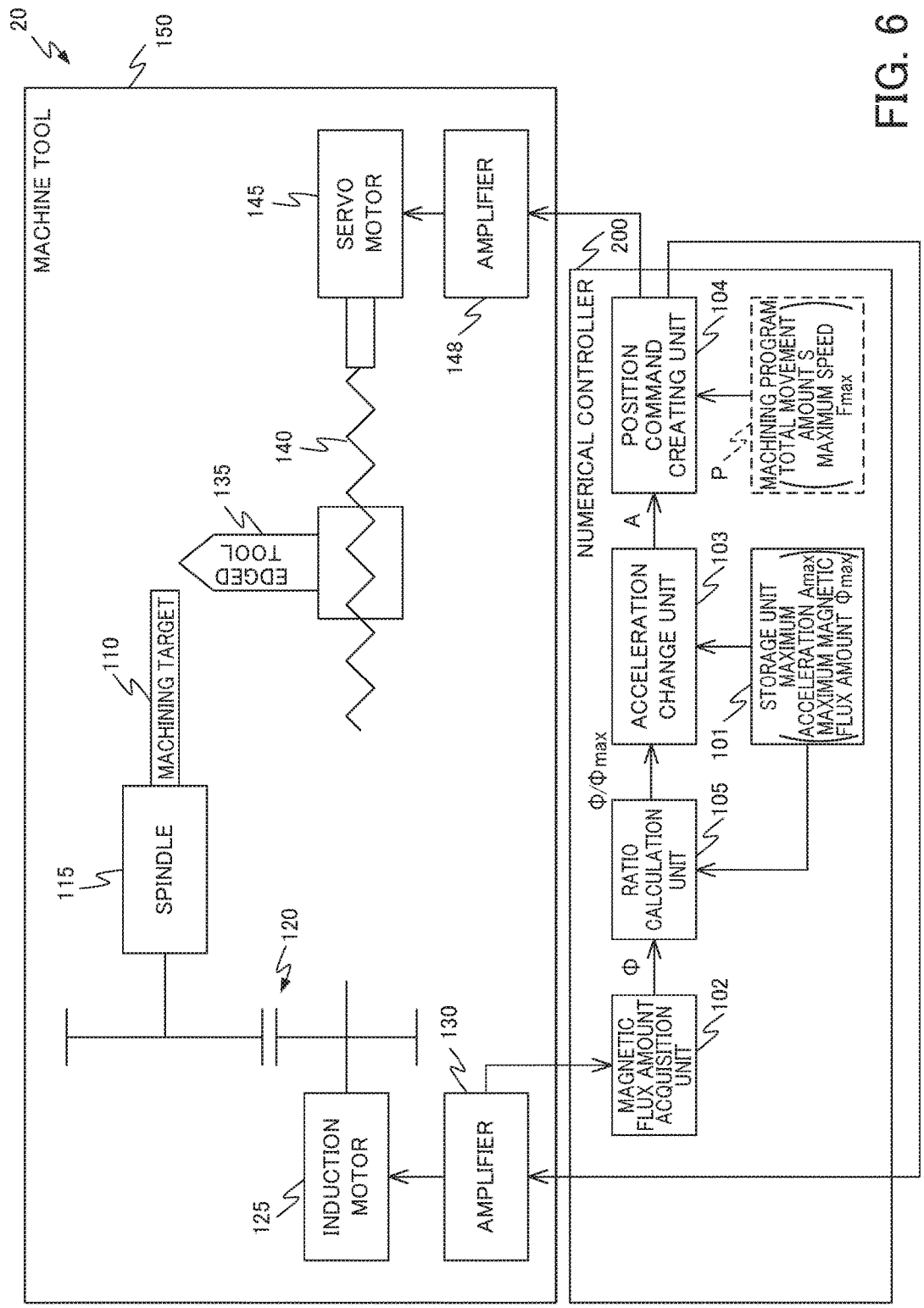
FIG. 6 is a diagram illustrating a configuration of control system according to a second embodiment of the present invention.

Hereinafter, a second embodiment of the present invention will be described with reference to FIGS. 6 and 7. FIG. 6 illustrates a configuration example of a numerical control system 20 according to a second embodiment of the present invention. The same constituent elements as those of the numerical control system 10 according to the first embodiment will be denoted by the same reference numerals, and the description thereof will be omitted.

A control system 20 includes a numerical controller 200 unlike the control system 10 according to the first embodiment. Here, although not illustrated in the drawing, the numerical controller 200 may include the same constituent elements and functions as those of an ordinary numerical controller.

The numerical controller 200 further includes a ratio calculation unit 105 unlike the numerical controller 100 according to the first embodiment. The ratio calculation unit 105 calculates the ratio (a magnetic flux amount ratio $\Phi/\Phi max$) of the present magnetic flux amount $\Phi$ acquired by the magnetic flux amount acquisition unit 102 to the maximum magnetic flux amount Φmax of the induction motor 125 stored in the storage unit 101, for example. The ratio calculation unit 105 transmits the calculated magnetic flux amount ratio Φ/Φmax to the acceleration change unit 103.

The acceleration change unit 103 changes the acceleration A of the position command based on the maximum acceleration Amax of the induction motor 125 according to the magnetic flux amount ratio Φ/Φmax calculated by the ratio calculation unit 105. Specifically, the acceleration change unit 103 changes the acceleration A of the position command according to the following equation (2) based on the maximum acceleration Amax of the induction motor 125, the maximum magnetic flux amount Φmax of the induction motor 125, and the present magnetic flux amount Φ (at the start of movement) of the induction motor 125.

$$A = Amax \times \Phi/\Phi max \qquad (2)$$

Figure 7:
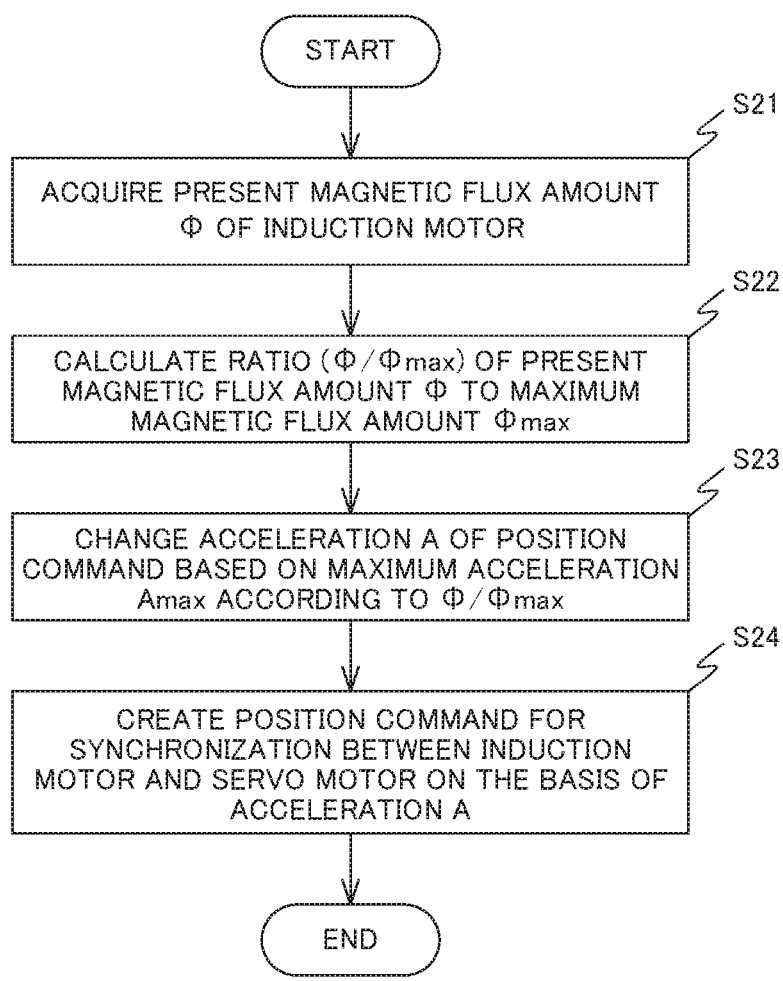
FIG. 7 is a diagram illustrating an operation of the control system according to the second embodiment of the present invention.

FIG. 7 illustrates an operation of the numerical control system 20 according to the second embodiment. In FIG. 7, an operation in which the induction motor 125 and the servo motor 145 are synchronously operated by position control, and the induction motor 125 is operated by switching the control mode from the speed control based on a speed command to the position control based on a position command is considered.

In step S21, the magnetic flux amount acquisition unit 102 acquires the present magnetic flux amount Φ (at the start of movement) of the induction motor 125 from the amplifier 130 similarly to the operation of step S11 in FIG. 3 described above.

Subsequently, in step S22, the ratio calculation unit 105 calculates the ratio Φ/Φmax (hereinafter also referred to as a "magnetic flux amount ratio Φ/Φmax") of the present magnetic flux amount Φ (at the start of movement) acquired by the magnetic flux amount acquisition unit 102 to the maximum magnetic flux amount Φmax of the induction motor 125 and transmits the magnetic flux amount ratio Φ/Φmax to the acceleration change unit 103.

Subsequently, in step S23, the acceleration change unit 103 changes the acceleration A of the position command based on the maximum acceleration Amax of the induction motor 125 according to the magnetic flux amount ratio Φ/Φmax calculated by the ratio calculation unit 105 similarly to the operation of step S12 in FIG. 3 described above. Specifically, the acceleration change unit 103 changes the acceleration A of the position command according to the equation (2) based on the maximum acceleration Amax of the induction motor 125, the maximum magnetic flux amount Φ max of the induction motor 125, and the present magnetic flux amount Φ (at the start of movement) of the induction motor 125. In this way, the acceleration change unit 103 changes the acceleration A of the position command such that the smaller the present magnetic flux amount ratio Φ/Φmax (at the start of movement) of the induction motor 125, the smaller the acceleration A of the position command. That is, the acceleration A is increased when the present magnetic flux amount ratio Φ/Φmax (at the start of movement) is large, whereas the acceleration A is decreased when the present magnetic flux amount ratio Φ/Φmax (at the start of movement) is small.

Subsequently, in step S24, the position command creation unit 104 creates the position commands of the induction motor 125 and the servo motor 145 on the basis of the acceleration A of the position command of the induction motor 125 changed by the acceleration change unit 103 and outputs the created position commands to the amplifiers 130 and 148 similarly to the operation of step S13 in FIG. 3 described above.

Advantages of Second Embodiment

In the numerical control system 20 according to the second embodiment, by changing the acceleration of the position command according to the magnetic flux amount of the induction motor 125, it is possible to suppress heat generation and realize stable position control similarly to the numerical control system 10 according to the first embodiment. Moreover, it is possible to suppress deterioration of the synchronization accuracy between the spindle motor and the feed axis motor. Moreover, when synchronous operation of the spindle motor and the feed axis motor is performed (that is, when the control mode of the induction motor 125 which is the spindle motor is switched from speed control to position control), it is possible to output the position command immediately and perform control of the induction motor 125.

While embodiments of the present invention have been described, the present invention is not limited to the above-described embodiments. Moreover, the advantages described in the present embodiment are just description of the most preferable advantages generated by the present invention and the advantages of the present disclosure are not limited to those described in the present embodiment.

For example, in the above-described embodiments, the control method by the numerical controller 100 or 200 is realized by software. When the control method is realized by software, a program that forms this software is installed in a computer (the numerical controller 100 or 200). Moreover, the program may be recorded on a removable medium and be distributed to a user and may be distributed by being downloaded to the computer of a user via a network. Furthermore, the program may be provided to the computer (the numerical controller 100 or 200) of a user as a web service via a network without being downloaded.

In the above-described embodiments, synchronous control between a spindle motor formed of an induction motor and a feed axis motor formed of a servo motor has been described. However, the features of the present invention are not limited to this but can be applied to synchronous control between two spindle motors formed of an induction motor. Furthermore, the features of the present invention can be applied to synchronous control of a plurality of motors including one or a plurality of spindle motors formed of an induction motor and one or a plurality of feed axis motors formed of a servo motor. In this case, the acceleration of the position commands for a plurality of motors may be changed on the basis of the smallest magnetic flux amount among the magnetic flux amounts of the plurality of spindle motors formed of an induction motor.

In the above-described embodiments, the acceleration of the position command was changed according to a present magnetic flux amount when the control mode of the induction motor is switched from speed control to position control to accelerate or decelerate the induction motor in a state in which the magnetic flux of the induction motor as a spindle motor is weak. However, the features of the present invention can be applied to a case in which the induction motor is accelerated or decelerated in a state in which the magnetic flux of the induction motor is weak when the induction motor is controlled by position control from the start.

EXPLANATION OF REFERENCE NUMERALS

10, 20: Numerical control system
100, 200: Numerical controller

101: Storage unit
102: Magnetic flux amount acquisition unit
103: Acceleration change unit
104: Position command creation unit
105: Ratio calculation unit
125: Induction motor (Spindle motor)
145: Servo motor (Feed axis motor)
150: Machine tool

What is claimed is:

1. A numerical controller for controlling a machine tool including a spindle motor formed of an induction motor, the numerical controller comprising:
 a storage unit that stores a maximum acceleration at which the spindle motor can operate when a magnetic flux amount of the spindle motor reaches its maximum;
 a magnetic flux amount acquisition unit that acquires a present magnetic flux amount of the spindle motor; and
 an acceleration change unit that changes an acceleration of a position command based on a maximum acceleration of the spindle motor stored in the storage unit according to a magnetic flux amount at the start of movement of the spindle motor acquired by the magnetic flux amount acquisition unit when the spindle motor is operated by position control using a position command.

2. The numerical controller according to claim 1, further comprising:
 a position command creation unit that creates a position command of a plurality of motors for synchronous operation on the basis of the acceleration of the position command of the spindle motor changed by the acceleration change unit when the plurality of motors including the spindle motor is synchronously operated by position control.

3. The numerical controller according to claim 1, wherein the acceleration change unit changes the acceleration of the position command such that the smaller the magnetic flux amount at the start of movement of the spindle motor, the smaller the acceleration of the position command.

4. The numerical controller according to claim 3, wherein the acceleration change unit changes the acceleration A of the position command according to the following equation (1) based on a maximum acceleration Amax of the spindle motor, a magnetic flux amount $\Phi$ at the start of movement of the spindle motor, and an arbitrary proportional constant $\alpha$ $$A = A\text{max} \times \alpha \times \Phi \quad (1).$$

5. The numerical controller according to claim 3, wherein the acceleration change unit changes the acceleration A of the position command according to the following equation (2) based on a maximum acceleration Amax of the spindle motor, a maximum magnetic flux amount $\Phi$max of the spindle motor, and a magnetic flux amount $\Phi$ at the start of movement, of the spindle motor $$A = A\text{max} \times \Phi / \Phi\text{max} \quad (2).$$

6. The numerical controller according to claim 1, wherein the magnetic flux amount acquisition unit estimates a present magnetic flux amount of the spindle motor and acquires the estimated magnetic flux amount as the present magnetic flux amount.

7. The numerical controller according to claim 1, further comprising:
 a ratio calculation unit that receives a present magnetic flux amount of the spindle motor acquired by the magnetic flux amount acquisition unit and calculates a magnetic flux amount ratio which is a ratio of the present magnetic flux amount of the spindle motor to the maximum magnetic flux amount of the spindle motor, wherein
 the acceleration change unit changes the acceleration of the position command based on the maximum acceleration of the spindle motor according to the magnetic flux amount ratio calculated by the ratio calculation unit.

* * * * *